United States Patent Office 3,457,315
Patented July 22, 1969

3,457,315
METHYLTHIO METHYL PHENOLIC COMPOUNDS AND METHOD OF PRODUCING SAME
John G. Moffatt, Los Altos, Calif., assignor to Syntex Corporation, Panama, Panama, a corporation of Panama
No Drawing. Filed Apr. 1, 1966, Ser. No. 539,280
Int. Cl. C07c *149/00;* B01j *1/16*
U.S. Cl. 260—609                    6 Claims

ABSTRACT OF THE DISCLOSURE

Process involving the treatment of a phenol with a sulfoxide and carbodiimide under anhydrous and acidic conditions to produce phenolic sulfides useful as, for example, anti-oxidants or intermediates.

---

The present invention is directed at a process utilizing a new chemical reaction and to the novel organic compounds thus obtained. In particular, this invention pertains to new procedures for preparing phenolic sulfides.

By the term "phenols" when employed in the present specification and claims is intended an organic compound of a mono or polycyclic structure comprising at least one six-member aromatic carbocyclic ring on which there is a free phenolic hydroxy group. Numerous compounds having such a structure are known in the literature and include, in addition to the simple monocyclic phenols such as phenol, cresols, anol, carvacrol, thymol and the like, polycyclic phenols such as naphthols, phenanthrols, hydroxyanthracene, hydroxychrysenes, estrone, hydroxypyrenes and the like, and heterocyclic phenols such as hydroxythianaphthenes, hydroxybenzofurans, hydroxyindoles, hydroxyindazoles, hydroxyimidazoles, hydroxyphenothiazines, hydroxyquinolines, hydroxyacridines, hydroxyphenazines, hydroxybenzomorphans and the like. These and other known phenols have a variety of uses, both as chemical intermediates and as final chemical entities. Thus, numerous alkylphenols find widespread use as antioxidants for organic material normally subject to oxidative deterioration, naphthols are employed as dye intermediates; while others such as hydroxybenzomorphans serve as intermediates in the preparation of other physiologically active compounds.

The present invention is directed at the process for the introduction into a phenol of the group:

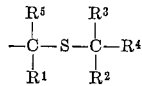

in which each of $R^1$ and $R^2$, independent of the other, is hydrogen, alkyl, alkoxyalkyl, phenyl, halophenyl, alkylphenyl, alkoxyphenyl, nitrophenyl, or when taken together, a polymethylene chain of from 2 to 8 carbon atoms; and each of $R^3$, $R^4$ and $R^5$ is hydrogen or alkyl.

By the term "alkyl" as well as derivations thereof such as "alkenyl," "alkynyl," and "alkoxy," is intended a branched or straight chain monovalent hydrocarbon unit. Although in the context of the present invention an upper limit need not be fixed on the number of carbon atoms in such chains, in practice such chains generally contain 30 or less carbon atoms and more often 20 or less carbon atoms. Typical of such groups are methyl, ethyl, propyl, isopropyl, butyl, sec-butyl, tert-butyl, pentyl, neopentyl, isophenyl, tert-pentyl, hexyl, heptyl, nonyl, decyl, dodecyl, tetradecyl, hexadecyl, octyldecyl, eicosyl and the like. In the case of the unsaturated aliphatic hydrocarbon chains, such as alkenyl or alkynyl, there will of course be at least 2 and in most cases not more than 6 to 8 carbon atoms.

The structure represented by Formula I is introduced according to this process into either or both of the positions ortho to the phenolic hydroxy group. In those instances where both ortho positions are blocked, i.e., each bear a substituent other than hydrogen, introduction occurs in the para position. Should both the para position and the two ortho positions be blocked, introduction will occur in the meta position.

The process of this invention involves the treatment of a phenol with at least an equimolar amount and generally a twofold to tenfold molar excess of a sulfoxide of the formula:

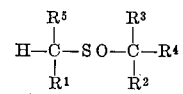         II wherein $R^1$, $R^2$, $R^3$, $R^4$ and $R^5$ are as defined above, in the presence of at least an equimolar amount and generally a twofold to tenfold molar excess of a carbodiimide. The reaction is executed under anhydrous conditions and in an acidic environment, i.e., in the presence of a proton source such as phosphoric acid, phosphorous acid, cyanoacetic acid, p-toluenesulfonic acid, iodoacetic acid, dichloroacetic acid, amines salts of strong acids such as the pyridinium salt of hydrochloric, sulfuric, perchloric, ortho-phosphoric and trifluoroacetic acids, and the like. Generally strong mineral acids and weak organic acids, while operable, are less satisfactory than the acids recited above. Particularly preferred are the oxyacids of phosphorus and halogenated acetic acids, e.g., dichloroacetic acid. Although the amount of acid employed is not particularly critical, one generally employs from about 0.2 to about 1 molar equivalents.

The carbodiimides employed in this process may be represented by the structure:

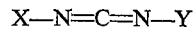         III in which each of X and Y is alkyl, cycloalkyl or aryl. Since the substituents in this carbodiimide do not appear in the final phenol obtained via this process, their nature is not critical. Typical of the suitable carbodiimides are N,N'-dimethyl-, N,N'-diethyl-, N,N'-dipropyl-, N,N'-dibutyl-, N,N'-dicyclohexyl-, N,N'-di(methylcyclohexyl)-, N,N'-ditolyl and N,N'-dixylylcarbodiimides, as well as mixed derivatives such as N-ethyl-N'-phenylcarbodiimide and N-cyclohexyl-N'-(4-pyridylmethyl)-carbodiimide.

Among the sulfoxides of the present invention which are included are the better known compounds such as dimethyl sulfoxide, methyl ethyl sulfoxide, diethyl sulfoxide, methyl propyl sulfoxide, ethyl propyl sulfoxide, dipropyl sulfoxide, diisopropyl sulfoxide, methyl butyl sulfoxide, methyl (tert-butyl) sulfoxide, methyl phenyl sulfoxide, methyl benzyl sulfoxide, dibenzyl sulfoxide, ethyl benzyl sulfoxide, bis-(β-aminoethyl) sulfoxide, methyl phenyl sulfoxide, tetramethylene sulfoxide, decamethylene sulfoxide, and the like. A useful method for the preparation of such sulfoxides involves the controlled oxidation of sulfides, as with hydrogen peroxides, perbenzoic acid, potassium permanganate, and the like.

Sulfides which may thus be oxidized include not only those which are known or which may be readily prepared through known methods, as through the alkylation of sodium mercaptides, the addition of mercaptans to olefins, etc., but also those which are prepared according to the process of this invention. Thus, a phenolic sulfide prepared according to this invention may be oxidized with 30% hydrogen peroxide to form the corresponding phenolic sulfoxide which itself may be recated with another phenol according to this process.

The process of this invention may be performed either with or without a solvent. In the case of liquid sulfoxides, the reagent itself may serve as the solvent. Alternatively in these instances and in those situations where higher hydrocarbon sulfoxides are employed, e.g., dibenzyl sulfoxide, an inert organic solvent is employed. Such solvents include benzene, xylene, toluene, diozane, tetrahydrofuran, ethyl acetate, methylene chloride, s-dichloroethane, chloroform, carbon tetrachloride, chlorobenzene, and the like. As indicated above, the reaction is executed under anhydrous conditions so that preferably the reactants and solvent are initially dried according to the usual methods. One method which as proved valuable is the use of alkali metal alumino-silicate molecular sieves.

The order of addition of reagents is not critical except insofar as the carbodiimide and the acid can react and should not be admixed, other than in the reaction medium. One highly satisfactory approach is first adding the carbodiimide to a solution of the phenol, sulfoxide and, if employed, the inert solvent, and then adding the acid to this mixture.

The reaction is generally conducted at temperatures ranging from 0° to 100° C. Since in most cases the reaction is exothermic, heat need not initially be applied and usually the reaction is commenced at about 0° C., utilizing external cooling. Heat can be applied in those instances where the reaction is obviously not progressing satisfactorily, but in view of possible side reactions discussed below, this should be practiced with caution. In most cases temperatures from 0° to 25° C. are completely satisfactory.

Although it is not intended as a binding explanation nor as a limitation upon the scope of this invention, it is presently believed that the reaction mechanism involves initial formation of a sulfonium isourea which reacts with the phenol to form an oxysulfonium salt. This salt, upon loss of a proton, forms a stabilized carbonion which intramolecularly alkylates the ortho position. Metal and para substitution is also believed to be predominantly intramolecular, proceeding through rearrangement of an intermediate cyclohexadienone.

The above postulated mechanisms are in agreement with a number of the side products which have been identified upon close examination of all the reaction products. Thus in the simplest case, that of phenol itself and dimethyl sulfoxide, there can be isolated, in addition to the principal product 2-(methylthiomethyl)phenol, varying amounts of the heretofore unknown 1,3-benzoxathian, 2,6-di(methylthiomethyl)phenol, and 8-(methylthiomethyl)-1,3-benzoxathian. Likewise, with p-nitrophenol and dimethyl sulfoxide there can be isolated, in addition to the major components 2-(methylthiomethyl)-4-nitro-phenol, varying amounts of 4-(methylthiomethoxy)-nitrobenzene; 6-nitro-1,3-benzoxathian; 3-(methylthiomethyl)-4-(methylthiomethoxy) - nitrobenzene; 6-nitro-1,3-benzoxathian; 3-(methylthiomethyl)-4-(methylthiomethoxy)-nitrobenzene and 2,6-di(methylthiomethyl)-4-nitrophenol.

Some aromatic phenols which are known to lack a high degree of bond mobility will also yield some non-phenolic side products with disrupted aromatic systems. Thus with 1-naphthol there is obtained, in addition to the predominant phenolic product, 2-methylthiomethyl-1-naphthol, a quantity of 2,2-di(methylthiomethyl)-1,2-dihydronaphthalen-1-one.

Some of the useful classes of compounds obtained via the process of this invention are those of the formulas:

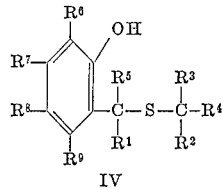
IV

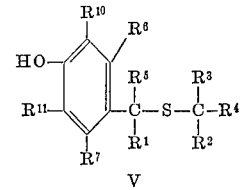
V

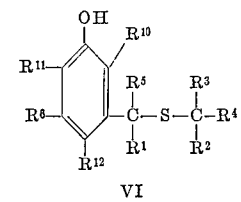
VI in which each of $R^1$ and $R^2$ is hydrogen, alkyl, alkoxyalkyl, phenyl, halophenyl, alkylphenyl, alkoxyphenyl, nitrophenyl, or taken together polymethylene;

each of $R^3$, $R^4$ and $R^5$ is hydrogen or alkyl;

each of $R^6$, $R^7$, $R^8$ and $R^9$ is hydrogen, halogen, nitro, amino, amido, alkyl, alkoxy, alkylthio, alkoxyalkyl, alkylthioalkyl, carboalkoxy, carboalkoxyalkyl, phenyl, phenylalkyl, phenoxy, phenoxyalkyl and haloalkyl;

each of $R^{10}$, $R^{11}$ and $R^{12}$ is as defined for $R^6$, $R^7$, $R^8$ and $R^9$ with the exception of hydrogen; and any two adjacent members of the group $R^6$, $R^7$, $R^8$, $R^9$, $R^{10}$, $R^{11}$ and $R^{12}$, taken together with the carbon atoms to which they are attached, are a carbocyclic or heterocyclic ring system of from 6 to 14 carbon atoms.

Of the above, those compounds wherein each of $R^1$ and $R^2$ is hydrogen, alkyl or phenyl are particularly useful.

The process of this invention is equally applicable to polycyclic phenolic starting materials such as estrone, 17α-methylestradiol, and the like, as to monocyclic phenols.

Of the monocyclic phenols, a preferred class may be represented by the formula:

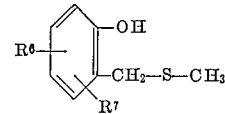
VII in which each of $R^6$ and $R^7$ is hydrogen, halogen, nitro, amino, amido, alkyl, alkoxy, alkylthio, alkoxyalkyl, carboalkoxy, carboalkoxyalkyl, phenyl, phenylalkyl, phenoxy, phenoxyalkyl or haloalkyl, particularly those compounds wherein each of $R^6$ and $R^7$ is hydrogen or alkyl.

A wide variety of substituents may be present elsewhere in the molecule, the principal restriction being that unprotected primary and secondary hydroxy groups (non-phenolic) will be oxidized to aldehydes and ketones respectively. When this is undesired, such hydroxy groups may be protected as through esterification or etherification with cleavage of such protecting groups at a subsequent stage of the particular synthesis to regenerate a hydroxy group.

The phenolic sulfides which are obtained via the process of this invention, in addition to representing a wide variety of new organic derivatives, are also valuable intermediates for producing new compounds. For example, the sulfide bond of the alkylthioalkyl group may be reductively cleaved to yield an alkyl group, thereby providing a method of preparing alkylphenols which, in contrast to known aromatic alkylation procedures, is extremely mild. Thus, upon the reduction of 2-methylthiomethylphenol with Raney nickel there is obtained o-cresol, a disinfectant and a valuable intermediate in the production of coumarin. Likewise by reacting 2,6-di-t- butylphenol with dimethyl sulfoxide according to the process of this invention and thereafter reducing with Raney nickel, there is obtained 2,6-di-t-butyl-p-cresol, a widely used antioxidant commonly known as BHT.

It should be noted in connection with alkylated phenolic antioxidants that the sulfide derivatives obtained via the process of this invention are themselves excellent antioxidants. As but one of many examples, use of diethyl sulfoxide and 2,6-di-t-butylphenol yields 2,6-di-t-butyl-4-[1-(ethylthio)ethyl]-phenol which is a stabilizer for polymeric substances such as polyethylene, polypropylene, and the like.

Alternatively to reduction, the sulfides of the present invention may be treated with a source of mercuric ions, such as mercuric acetate, to yield the corresponding hydroxyalkyl derivatives, or may be oxidized in the usual fashion to yield sulfoxides or sulfones.

The following examples will serve to further typify the nature of this invention, but should not be construed as a limitation on the scope thereof:

Example 1

To a mixture of 3.5 g. (.025 mole) of p-nitrophenol, 10 ml. of dry dimethyl sulfoxide and 10 ml. of anhydrous benzene, cooled to 0° C. is added 1.2 g. of anhydrous phosphoric acid and 15.5 g. of dicyclohexylcarbodiimide. After allowing the exothermic reaction to proceed for one hour with periodic cooling, 100 ml. of ethyl acetate are added. The solid material (dicyclohexylurea) is removed by filtration, and the filtrate is extracted three times with 100 ml. portions of water and evaporated to dryness. The residue is dissolved in 200 ml. of benzene and extracted with 0.1 N aqueous sodium hydroxide until the extracts are colorless. The aqueous extracts are combined, treated with phosphoric acid to pH 3 and extracted with ethyl acetate. These organic extracts are washed with water, dried and evaporated to dryness. The residue is dissolved in acetone and the remaining solid is removed by filtration. This solution is placed on a column of 150 g. of silica and chromatographed, eluting with benzene to yield first 2,6-di(methylthiomethyl)-4-nitrophenol, M.P. 76.5–77.5° C., (benzene:petroleum ether), followed by 2-methylthiomethyl-4-nitrophenol, M.P. 127.5–128.5° C. (benzene).

By washing the above benzene solution of non-alkali extractable material with water, drying and evaporating to dryness, there is obtained, after chromatography on 150 g. of silica and elution first with 1:1 benzene:petroleum ether and then methylene chloride, 6-nitrobenzoxathian, M.P. 135–136° C. (methanol), 4-(methylthiomethoxy)nitrobenzene, M.P. 50–51° C. (methanol), and 3-methylthiomethyl-4-(methylthiomethoxy)nitrobenzene, M.P. 61–62° C. (methanol).

By employing p-chlorophenol, p-cresol, p-tert-butylphenol, p-fluorophenol, p-iodophenyl, p-acetamidophenol, p-tert-amylphenol, p-benzylphenol, p-butoxyphenol, p-hydroxybiphenyl and p-cyclohexylphenol, the following compounds are obtained via the foregoing procedure, 2-methylthiomethyl-4-chlorophenol; 2-methylthiomethyl-4-methylphenol; 2-methylthiomethyl-4-tert-butylphenol; 2-methylthiomethyl-4-fluorophenol; 2-methylthiomethyl-4-iodophenol; 2-methylthiomethyl-4-acetamidophenol; 2-methylthiomethyl-4-benzylphenol; 2-methylthiomethyl-4-butoxyphenol; 3-methylthiomethyl-4-hydroxybiphenyl; and 2-methylthiomethyl-4-cyclohexylphenol, respectively.

Example 2

To a cooled (0° C.) mixture of 1.39 g. (0.1 mole) of o-nitropenol in 5 ml. of dimethyl sulfoxide and 5 ml. of benzene are added 6 g. of dicyclohexylcarbodiimide, followed by 5 g. of anhydrous phosphoric acid. The exothermic reaction is cooled in an ice bath for two hours, diluted with 50 ml. of benzene and extracted three times with 50 ml. portions of water. The organic phase is extracted with 0.1 N aqueous sodium hydroxide, and these alkaline extracts are rendered acidic with phosphoric acid and are extracted with ethyl acetate. After washing these organic extracts with water and drying over sodium sulfate, they are evaporated to dryness to yield 2-methylthiomethyl-6-nitrophenol, which may be recrystallized from ethanol, M.P. 78–79° C.

From the non-phenolic fraction, there may be obtained through chromatography on silica, 2-(methylthiomethoxy)nitrobenzene and 2-(methylthiomethoxy)-3-(methylthiomethyl)nitrobenzene, both of which are oils.

The following compounds are also obtained from the appropriately o-substituted phenolic starting material via the procedure of this example, 2-methylthiomethyl-6-chlorophenol; 2-methylthiomethyl-6-methylphenol; 2-methylthiomethyl-6-t-butylphenol; 2-methylthiomethyl-6-fluorophenol; 2-methylthiomethyl-6-iodophenol; 2-methylthiomethyl-6-acetamidophenol; 2-methylthiomethyl-6-t-amylphenol; 2-methylthiomethyl-6-benzylphenol; 2-methylthiomethyl-6--butoxyphenol; 1-hydroxy-2-methylthiomethylbiphenyl; and 2-methylthiomethyl-6-cyclohexylphenol.

Example 3

By treating 3.6 g. of α-naphthol in 10 ml. of dimethyl sulfoxide and 10 ml. of benzene with 15.5 g. of dicyclohexyl-carbodiimide and 1.2 g. of anhydrous phosphoric acid in the manner of Example 1, there is obtained after purification on silica, 2-methylthiomethyl-1-naphthol as a distillable liquid;

$$\lambda_{max.}^{MeOH}\ 293\ m\mu,\ \Sigma=4{,}500;\ 327\ m\mu,\ \Sigma=2{,}500$$

By subjecting 4.7 g. of phenol in 25 ml. of dimethyl sulfoxide and 50 ml. of benzene to the action of 30 g. of dicyclohexylcarbodiimide and 0.5 g. of anhydrous phosphoric acid in the manner of Example 1, there are obtained 2-methylthiomethylphenol $$(\lambda_{max.}^{MeOH}\ 278\ m\mu,\ \Sigma=2{,}900)$$

and 2,6-di(methylthiomethyl)phenol $$(\lambda_{max.}^{MeOH}\ 283\ m\mu,\ \Sigma=2{,}870)$$

both as distillable liquids.

Example 4

To a mixture of 3.05 g. of 2,6-dimethylphenol in 10 ml. of benzene and 10 ml. of dimethyl sulfoxide are added 15.5 g. of dicyclohexylcarbodiimide and 1.2 g. of anhydrous phosphoric acid. A rapid exothermic reaction occurs to form 2,6-dimethyl-4-methylthiomethylphenol, M.P. 38–40° C., which is isolated through chromatography on silica with benzene according to the manner described in Example 1.

Under the same reaction conditions there is obtained from 2,4,6-trimethylphenol, 2,4,6-trimethyl-3-methylthiomethylphenol, M.P. 85–86° C. (hexane).

Example 5

By treating 3.5 g. of estrone in 10 ml. of dimethyl sulfoxide and 20 ml. of benzene with 9 g. of dicyclohexylcarbodiimide and 0.7 g. of anhydrous phosphoric acid, there is obtained upon chromatography on silica after the usual work-up, 2-methylthiomethylestrone, M.P. 204–207° C., and 4-methylthiomethylestrone, M.P. 154–156° C.

Example 6

A solution of 2 g. of o-cresol in 2 ml. of dimethyl sulfoxide and 20 ml. of benzene is treated with 10 g. of dicyclohexylcarbodiimide and 0.98 g. of phosphoric acid, according to the procedure described in Example 1. Upon extraction with aqueous sodium hydroxide, neutralization of these extracts, and chromatography on silica acid with benzene, there is obtained 2-methyl-6-methylthiomethylphenol,

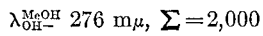

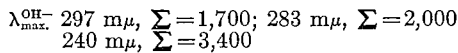

In a similar fashion by treating 1.1 g. of o-cresol in 3 ml. of methyl tert-butyl sulfoxide and 20 ml. of ether with 5 g. of dicyclohexybodiimide and 0.5 g. of anhydrous phosphoric acid according to the procedure of Example 1, there is obtained 2-methyl-6-(tert-butylthiomethyl)phenol,

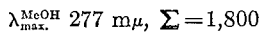

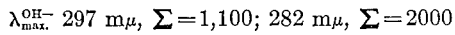

By employing benzyl methyl sulfoxide, there is similarly obtained 2-methyl-6-[α-(methylthio)-benzyl]phenol.

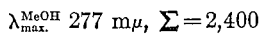

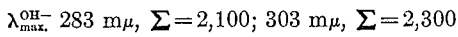

By employing tetramethylene sulfoxide in this procedure there is obtained 2-(2-hydroxy-3-methylphenyl)tetrahydrothiophene.

Alternatively, the use of dibenzyl sulfoxide yields 1-[α-(benzylthio)benzyl]-6-methylphenol,

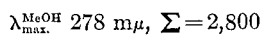

Example 7

Three grams of 2,5-dimethylphenol in 20 ml. of benzene and 10 ml. of dimethyl sulfoxide are treated with 15 g. of dicyclohexylcarbodiimide and 1.2 g. of phosphoric acid according to the procedure of Example 1. Upon completion of the steps therein described there is obtained 2,5-dimethyl-6-methylthiomethylphenol as a distillable oil,

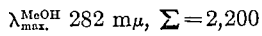

Example 8

Upon subjecting 2,3,5,6-tetramethylphenol (3.8 g.) to the procedure of Example 1, employing however, 1.1 ml. of dichloroacetic acid in place of phosphoric acid, and treating a methanol solution of the product formed upon chromatography with a drop of hydrochloric acid, there is immediately formed as a solid 2,3,5,6-tetramethyl-4-methylthiomethylphenol, M.P. 144–145° C.

By substituting methyl tert-butyl sulfoxide in the foregoing procedure there is obtained 2,3,5,6-tetramethyl-4-(tert-butylthiomethyl)phenol, M.P. 179–182° C.

Example 9

The procedure described in Example 1 is repeated, employing, however, pyridinium trifluoroacetate, dichloroacetic acid and trifluoroacetic acid in place of phosphoric acid. In each instance, a rapid reaction ensures and identical products are obtained.

Example 10

A solution of 2-methyl-6[α-(methylthio)benzyl]phenol in methanol is gently refluxed for 15 minutes with Raney nickel (Davidson sponge nickel). Upon filtration and concentration of the filtrate, there is obtained 2-methyl-6-benzylphenol, M.P. 49–50° C.

In a similar fashion from 2-(2-hydroxy-3-methylphenyl)-tetrahydrothiophene; 2-[α-benzylthio)benzyl]-6-methylphenol; 2, 5- dimethyl-6-methylthiomethylphenol; and 2,3,5,6-tetramethyl-4-methylthiomethylphenol [or 2,3, 5,6-tetramethyl - 4 - (tert-butylthiomethyl)phenol], there are respectively obtained according to the foregoing procedure, 2-butyl-6-methylphenol; 2-benzyl-6-methylphenol, M.P. 60–62° C.; and pentamethylphenol, M.P. 126–128° C.

What is claimed is:

1. A thiomethyl phenolic compound selected from the group consisting of 2-methylthiomethyl-4-nitrophenol, 2,6-di(methylthiomethyl) - 4 - nitrophenol, 2-methylthiomethyl-4-butoxyphenol, 2-methylthiomethyl - 6 - nitrophenol, 2-methylthiomethyl - 6 - butoxyphenol, 2,6-di(methylthiomethyl)phenol, 2 - methylthiomethyl-1-naphthol, 2,3,5,6 - tetramethyl - 4 - methylthiomethylphenol and 2,3,5,6-tetramethyl-4-(tert-butylthiomethyl)phenol.

2. The method which comprises treating a compound having a six-membered aromatic carbocyclic ring on which there is at least one replaceable hydrogen atom and a free phenolic hydroxy group, with a molar excess of a sulfoxide of the formula:

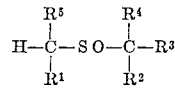

wherein
each of $R^1$ and $R^2$ is hydrogen, alkyl, alkoxyalkyl, phenyl, halophenyl, alkyphenyl, alkoxyphenyl, nitrophenyl benzyl, or taken together polymethylene; and each of $R^3$, $R^4$ and $R^5$ is hydrogen or alkyl, under anhydrous, acidic conditions in the presence of a molar excess of a carbodiimide of the formula:

$$X-N=C=N-Y$$

in which each of X and Y is alkyl, cycloalkyl or aryl, so as to introduce the group:

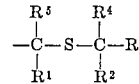

in a position ortho to the hydroxy group or, if both positions ortho are substituted by groups other than hydrogen, in the position para to the hydroxy group, or if all the positions ortho and para to the hydroxy group are substituted by groups other than hydrogen, in a position meta to the hydroxy group.

3. The method of claim 1 wherein each of $R^1$ and $R^2$ is hydrogen or alkyl.

4. The method of claim 1 wherein each of $R^1$ and $R^2$ is hydrogen or alkyl and each of X and Y is alkyl or cycloalkyl.

5. The method which comprises treating a monocyclic aromatic compound having a nucleus of 6 carbon atoms, one of said carbon atoms being substituted by a free phenolic hydroxy group and, another of said carbon atoms being substituted by a hydrogen atom, with a molar excess of a dialkyl-sulfoxide under anhydrous, acidic conditions in the presence of a dialkylcarbodiimide or dicycloalkylcarbodiimide so as to replace a hydrogen atom on the aromatic ring with an alkylthioalkyl group, the replacement occurring in a position ortho to the hydroxy group or, if there is no ortho hydrogen atom, in the position para to the hydroxy group, or if there is neither an ortho nor para hydrogen atom, in a position meta to the hydroxy group.

6. The method of claim 4 where the dialkylsulfoxide is dimethyl sulfoxide and the carbodiimide is dicyclohexylcarbodiimide.

(References on following page)

References Cited

UNITED STATES PATENTS

| | | | |
|---|---|---|---|
| 3,336,393 | 8/1967 | Weil et al. | 260—609 XR |
| 3,260,757 | 7/1966 | O'Shea | 260—609 |
| 2,417,118 | 3/1947 | McCleary | 260—609 |

OTHER REFERENCES

Burdow et al.: "J.A.C.S." vol. 87, No. 20, pp. 4656–4658 (1965).

CHARLES B. PARKER, Primary Examiner

D. R. PHILLIPS, Assistant Examiner

U.S. Cl. X.R.

252—402, 404; 260—243, 247.1, 267, 279, 289, 296, 309 310, 326.12, 328, 330.5, 332.3, 346.2, 397.3, 551, 556, 562, 578, 590, 600, 607, 621, 624